INVENTOR
L. B. ROOF

BY Young & Quigg

ATTORNEYS

TIME

United States Patent Office 3,444,722
Patented May 20, 1969

3,444,722
DEVICE FOR SUPPLYING CARRIER GAS TO TRANSPORT ELUTED PORTION OF SAMPLE AND TO BACKFLUSH CHROMATOGRAPHIC COLUMN
Lewis B. Roof, Bartlesville, Okla., assignor to Phillips Petroleum Company, a corporation of Delaware
Filed Sept. 9, 1966, Ser. No. 578,387
Int. Cl. G01n 31/08
U.S. Cl. 73—23.1                                      7 Claims

ABSTRACT OF THE DISCLOSURE

A fluid flow blending device is connected between the outlet of a first chromatographic column and a second column or a detector. The device comprises a chamber into which extends a first inner nozzle connected to the first column outlet, the exhaust end of the first nozzle having a smaller diameter than the first column outlet or the outlet of the device. A source of carrier gas is connected to the chamber. A second inner nozzle having an exhaust end diameter smaller than the first column outlet or the outlet of the device can be employed to introduce the carrier gas into the chamber. Upon the cessation of flow of eluting carrier gas forwardly through the first column, the carrier gas from said source flows through said device to continue the transporting of the eluted portion of the sample and to backflush the first column.

---

This invention relates to chromatography. In another aspect, this invention relates to a novel carrier gas flow system for a chromatographic analyzer. In another aspect, this invention relates to a novel fluid flow blending device.

In a typical analysis of a fluid sample, a mixture of carrier fluid and sample fluid is passed through a chromatographic column with sorbent which separates the sample into its pure components.

It is frequently necessary in chromatographic analysis to analyze mixtures containing high and low boiling components covering a wide range of boiling point temperatures. If all components of such a sample are flushed through the column of a conventional analyzer, then all components are separated by the column, requiring an excessive total analysis time because the high boiling components pass through the column more slowly than the low boiling components. In many cases, only the boiling components in a sample are of analytical interest, and the separation of the high boiling components in the sample ties up the equipment for an unproductive period. Therefore, methods of and apparatus for chromatographic analysis have been developed whereby high boiling components are grossly separated from low boiling components. This is normally done by flowing the sample through a short column of relatively poor resolution before flowing it through the conventional packed column. This short column separates the higher boiling components from the lower boiling components, and the lower boiling components are then passed to a second column where the components of that group are therein separated and eluted in sequence to an analyzer. As previously stated, in many cases, only the low boiling components are of analytical interest; therefore, the conventional analysis procedure is to stop the forward flow of carrier gas through the preliminary column after substantially all of the components of the first group and before any appreciable portion of the components of the second group have emerged from the preliminary column, and then backflush the second group from the preliminary column while the first group is eluted through the second column. This is normally accomplished by placing a backflushing valve in the conduit connecting the two columns which will inject a second carrier gas stream into the connecting conduit after the components from the first group have passed the point of injection, and the flow of the first carrier gas stream has been stopped. The second carrier gas stream will flow in both direction through the connecting conduit and thereby backflush the second group of components from the preliminary column while eluting the first group of components through the second column.

However, problems arise in detecting the first group of components which are caused by pressure transients such as pressure surges of the second carrier gas stream to the second column and resolution losses due to components of the first group being spread out or diffused into conduits in the backflushing valve or conduits connecting the backflushing valve to the conduit connecting both columns. The pressure transients will cause abnormal fluctuations in the output of the detector, and the diffusion of components will cause resolution loss which is the spreading out or flattening of the sample peaks arriving at the detector, which in turn results in the inability to detect some components and poor quantitative determination of the detectable peaks. It must also be noted that these same problems occur in many operations when a backflushing valve is connected to the conduit which connects a single chromatographic column and a detector, and it is desired to backflush the column after the components are eluted therefrom but before they reach the detector.

Therefore, one object of this invention is to provide an improved carrier gas flow system for a chromatographic apparatus.

Another object of this invention is to provide a novel method of and apparatus for preventing pressure transients and sample peak spreading in the carrier gas flow system to a chromatographic detector in a chromatographic analyzer.

A further object of this invention is to provide a novel fluid flow blending device.

Other objects and advantages of this invention will be apparent to one skilled in the art upon study of this disclosure.

According to one embodiment of this invention, resolution losses and unwanted pressure transients are prevented in the chromatographic analysis operation wherein a first carrier gas stream elutes components through a first column to a conduit connecting a second column or a detector, and then a second carrier gas stream is introduced into the connecting column which simultaneously backflushes the said first column while eluting components through a second column or to a detector by passing the first carrier gas stream from the first column through a gas blending zone which replaces the standard backflushing valve and by maintaining the flow of the second carrier stream into the said gas blending zone during the time the components are eluted by the first carrier stream through the first column. The pressure of the second carrier gas stream is being maintained slightly above the pressure of the first carrier stream from the first column. After the components are eluted from the first column and flow through the blending device, the flow of the first carrier stream is shut off, thereby allowing the second carrier stream to flow forward through the second column or to a detector and backward through the first column. This embodiment is utilized when using either a flame ionization detector which makes a quantitative analysis of the entire sample stream or a thermal conductivity detector which makes an analysis of the concentration of the sample stream, but it is especially useful when utilizing a flame ionization detector because loss of sample components is thereby prevented.

According to another embodiment of this invention, the pressure of the second carrier gas stream is maintained slightly lower than the pressure of the first carrier gas stream. The pressure transients are prevented in a similar manner as described above, but a small bleed off of the sample components occurs from the first to the second carrier stream. Therefore, this method is useful only when using a thermal conductivity detector because total concentration is not affected by the bleed off.

This invention can be better understood from a study of the drawings in which.

Figure 1:
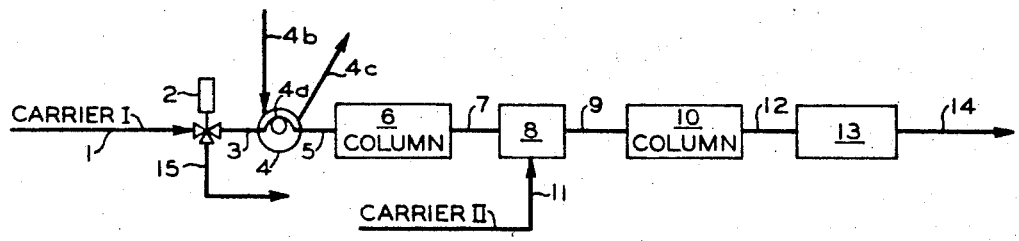
FIGURE 1 is a schematic flow diagram illustrating one embodiment of this invention.

Now referring to FIGURE 1, there is shown a dual column chromatographic apparatus with columns connected in series adapted for use for this invention. When valve 2 is in a first position, carrier I enters conduit 1, flows through valve 2, conduit 3, sample valve 4, conduit 5, column 6, conduit 7, blending device 8, conduit 9, column 10, conduit 12, detector 13 and out vent conduit 14. When sample valve 4 is in a first position, sample from conduit 4b flows through sample loop 4a and out sample vent line 4c, and carrier I flows directly through sample valve 4 into conduit 5. When sample valve 4 is changed to a second position, fluid sample flows from conduit 4b directly through valve 4 and out exhaust conduit 4c, and carrier I flows through sample loop 4a and thereby carries entrapped sample components into conduit 5. During this period, a steady flow of carrier II is maintained through conduit 11 into blending device 8. Blending device 8 is any device similar to the devices illustrated in FIGURES 3 and 4 which will be discussed in detail below. Carrier II is maintained at a slightly higher pressure than the pressure of carrier I coming from column 6. In this manner, a trickle flow of carrier II is maintained through blending device 8 at all times carrier I is flowing therethrough. This trickle flow will prevent any sample components eluted from column 6 from diffusing into a conduit junction between conduits 7, 11 and 9. After components have eluted past blending device 8, valve 2 will be changed to a second position which will cause the flow of carrier I to be shut off, and conduit 3 will communicate with conduit 15. As valve 2 closes and the flow of carrier I is proportionally decreased, the flow of carrier II within conduits 7 and 9 will be proportionally increased; therefore, pressure transients in the carrier gas to detector 13 will be thereby prevented. Thus, carrier II will flow backward from blending device 8 through conduit 7, column 6, conduit 5, sample valve 4, conduit 3, valve 2 and out vent line 15 and will thereby backflush column 6. Carrier II will also flow forward through conduit 9, column 10, conduit 12, detector 13 and out vent line 14 and will thereby elute sample components through column 10 to detector 13. Detector 13 may be either a thermal conductivity detector or flame ionization detector when the pressure of carrier II is slightly above the pressure of carrier I from column 6. Pressure of carrier II is normally set from 1 to 5 percent higher than equalization pressure of carrier I between columns 6 and 10. However, the carrier II pressure can be differentially set for different types of detectors. For example, when using flame ionization detectors which make a quantitative determination of the entire sample stream, it is necessary that the pressure of carrier II be maintained slightly above the equalization pressure between columns 6 and 10 in order that a slight trickle of carrier II be admitted in the fluid stream between the columns to thereby prevent any diffusion of sample components into the carrier II conduit, but when using a thermal conductivity detector which measures concentration only, carrier II pressure can be set slightly below (from 1 to 5 percent) the equalization pressure between the columns which in turn will allow a small bleed off of the fluid stream between the columns, said bleed off in no way will affect the concentration of the sample peaks.

Figure 2:
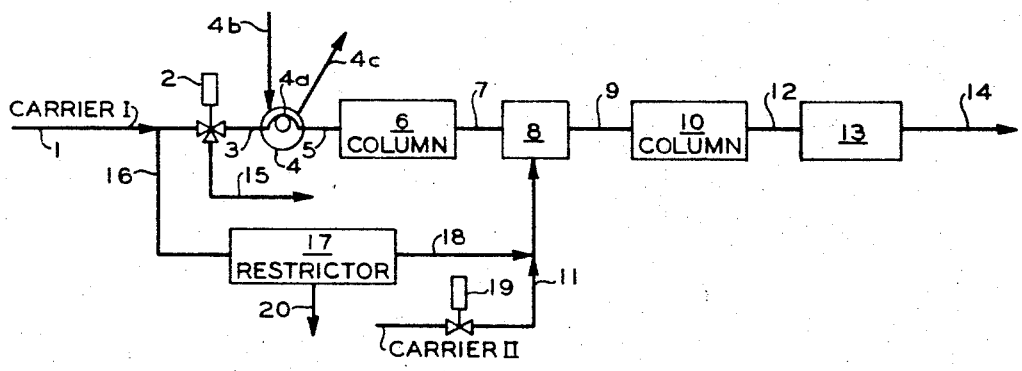
FIGURE 2 is a schematic flow diagram illustrating another embodiment of this invention.

FIGURE 2 is a schematic flow diagram illustrating another embodiment of this invention which can be used when detecting with a thermal conductivity detector. In this embodiment, detector 13 is a thermal conductivity detector, and valve 19 is situated within conduit 11. Thus, during elution of components through column 6, carrier I stream is split from conduit 1 by conduit 16 and flows through restrictor 17, conduit 18 and conduit 11 to blending device 8. Restrictor 17 can be a variable restrictor device and is set to maintain the pressure of carrier I through conduit 11 slightly lower than the pressure of carrier I from conduit 7. A small bleed off is allowed via conduit 20 from the back pressure on restrictor 17, conduits 11 and 18. This prevents alteration of the concentration of peaks passing through blender 8. Therefore, in the operation of this embodiment, small portions of sample peaks are removed in blender 8 and subsequently passed out through vent line 20, and this removal in no way affects the resultant concentration of the sample peaks as registered in thermal conductivity detector 13. During this operation, valve 19 is placed in a first position and carrier II is prevented from flowing therethrough. After sample components have eluted past blender 8, valve 2 is placed in a second position, the flow of carrier I into conduit 3 is slowly shut off, and valve 19 opens in a manner that will provide a non-transient flow into conduit 9, column 10, column 12 and detector 13.

Figure 3:
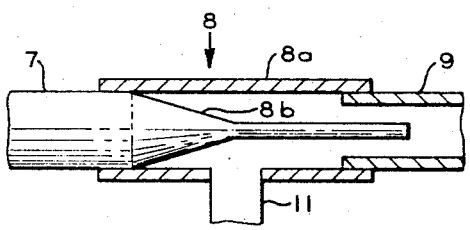
FIGURE 3 is a sectional view of the blending device of this invention.
Figure 4:
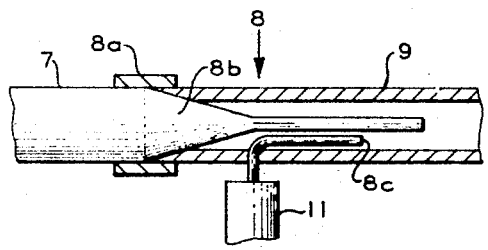
FIGURE 4 is a sectional view of another embodiment of the flow blending device of this invention.

FIGURES 3 and 4 are sectional views of embodiments of flow blending devices of this invention. Now referring to FIGURE 3, outer conduit chamber 8a is operatively connected to conduits 7 and 9. Outer conduit chamber 8a connects to conduit 11 as shown. Nozzle 8b is operatively attached to the end of conduit 7 and narrows in diameter at the exhaust end thereof, the exhaust end extending partially into conduit 9. Nozzle 8b will substantially increase the flow rate of carrier I flowing through conduit 7. Outer conduit chamber 8a is of greater diameter than conduit 9 and the junction of outer conduit chamber 8a with conduit 9 will provide a flow restriction for carrier II flowing from conduit 11 which in turn will increase the flow rate of carrier II therethrough. The flow rate of carrier I through nozzle 8b will be substantially higher than the flow rate of carrier II into conduit 9 even when carrior II is maintained at a slightly higher pressure than carrier I. This will assure that the carrier-sample stream will flow into conduit 9 and not back into conduit 7. On the other hand, if carrier II is of slightly lower pressure than carrier I, this nozzle arrangement will assure that only small bleed off of sample components from conduit 7 will flow through conduit 11. Therefore, this device can be used in either the chromatographic apparatus of FIGURE 1 or the chromatographic apparatus of FIGURE 2. FIGURE 4 illustrates another embodiment of a flow blending device of this invention. Outer conduit 8a joint conduits 7 and 9 and nozzle 8b is operatively connected to the end of conduit 7, and nozzle 8c is operatively connected to the end of conduit 11 which in turn is operatively connected in conduit 9. Nozzle 8c substantially increases the velocity of carrier II flowing through conduit 11. This is particularly useful when utilizing a flame ionization detector when it is necessary to prevent the loss and diffusion of all sample components flowing from column 6.

The process and apparatus of this invention can be better understood from a study of the following example.

Figure 5:
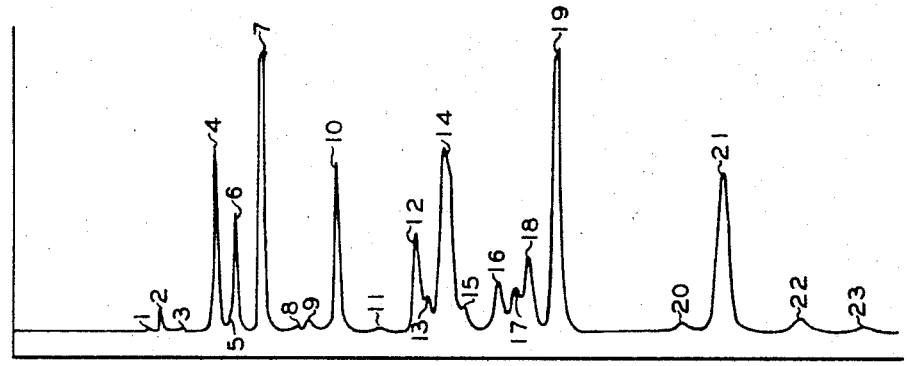
FIGURE 5 is a recorded detector output from a chromatographic column apparatus having two columns operated in a series with the flow blending device of FIGURE 3 connected therebetween.
Figure 6:
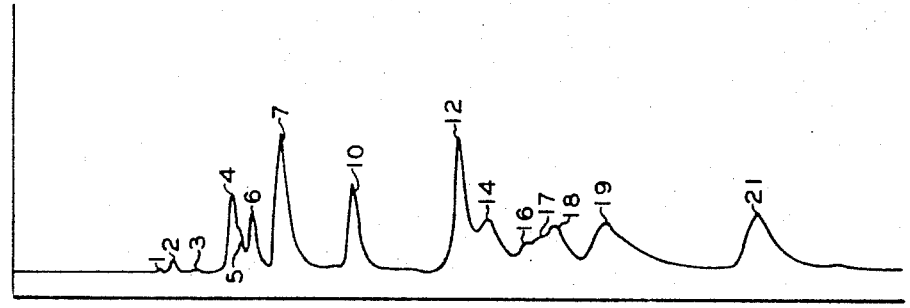
FIGURE 6 is a recorded detector output from a chromatographic apparatus having two columns operated in series with a standard backflush valve therebetween.
Figure 7:
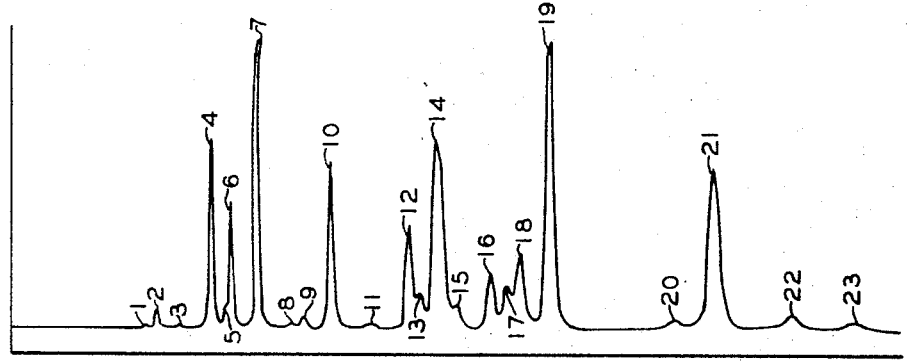
FIGURE 7 is a recorded detector output from a chromatographic apparatus having two columns operated in series, with the columns directly connected by a conduit.

FIGURES 5-7 illustrate the detector outputs from runs 1-3 below. The numbers illustrating the various sample peaks in FIGURES 5-7 correspond to the following compounds:

| | |
|---|---|
| 1 | Isopentane. |
| 2 | n-Pentane. |
| 3 | 2,2-dimethyl butane. |
| 4 | 2-methyl pentane. |
| 5 | Cyclopentane. |
| 6 | 3-methyl pentane. |
| 7 | n-Hexane. |
| 8 | 2,2-dimethyl pentane. |
| 9 | 2,4-dimethyl pentane. |
| 10 | Methyl cyclopentane. |
| 11 | 3,3-dimethyl pentane. |
| 12 | 2-methyl hexane. |
| 13 | 2,3-dimethyl pentane. |
| 14 | 3-methyl pentane and cyclohexane. |
| 15 | 1,1-dimethyl cyclopentane. |
| 16 | Trans-1,3-dimethyl cyclopentane. |
| 17 | Cis-1,2-dimethyl cyclopentane. |
| 18 | Trans-1,2-dimethyl cyclopentane. |
| 19 | n-Heptane. |
| 20 | Unknown. |
| 21 | Methyl cyclohexane. |
| 22 | Unknown. |
| 23 | Unknown. |

RUN 1

The apparatus of FIGURE 1 was utilized with the fluid blender of FIGURE 3 operatively connecting conduits 7 and 8. Column 6 is a stainless steel column 50 feet long, 10 mils in diameter and packed with silicon Dow Corning 550 sorbent material. Column 6 was maintained at 70° C. Column 10 was a stainless steel column 150 feet long and 10 mils in diameter packed with silicon Dow Corning 550 sorbent material and was maintained at 10° C. A standard flame ionization detector was utilized as detector 13. It was desired to analyze $C_5-C_7$ components in a heavy refinery stream containing $C_5-C_8+$. A sample from the refinery stream was first trapped in sample loop 4a. Carrier I, which was helium flowing at 6 cc. per minute, then pushed the sample from the sample loop through conduit 5 into column 6 wherein the $C_8$ and heavier components were immediately sorbed by column packing and the $C_5-C_7$ components were eluted therethrough. Substantially all of the $C_5-C_7$ components eluted through column 6 in 2 minutes and 30 seconds. The pressure in conduit 7, blender 8 and conduit 9 between columns 6 and 10 was maintained at 22 p.s.i.g. Carrier II which was also helium was maintained at 25 p.s.i.g. which allowed a very small flow of carrier II into the carrier I-sample fluid mixture flowing to column 10. At a predetermined time (2 minutes and 40 seconds) the flow of carrier I was shut off and valve 2 was positioned to vent column 6. Carrier II immediately flowed through conduit 7, column 6, conduit 5, sample valve 4, conduit 3, valve 2 and out conduit 15 to backflush column 6, and simultaneously through conduit 9, column 6, conduit 12 to detector 13 to thereby elute the lighter constituents through column 10 to detector 13. The recorded output of detector 13 is illustrated by FIGURE 5.

RUN 2

A second run was made with the apparatus of FIGURE 1 except instead of a blending device connecting conduits 7 and 9, a standard backflushing valve was there positioned. The run was carried out in the same manner as Run 1 with the same sample constituents, except that carrier II only flowed through the backflushing valve into conduits 7 and 9 after the $C_5-C_7$ components had been eluted past the said backflushing valve, and the flow of carrier I had been shut off. The output of detector 13 is illustrated by FIGURE 6.

RUN 3

A third run was carried out in the same manner as the prior two runs except that conduits 7 and 9 were directly connected and carrier II was completely eliminated from the operation. The output of detector 13 is illustrated by FIGURE 7.

In comparing the outputs from Runs 1-3, there is no observable difference between the outputs of Runs 1 and 3 in that all the sample peaks are clearly and similarly illustrated. However, in comparing the output of Run 2 with Run 1, it is apparent that the apparatus of Run 2 produced a diagram illustrating resolution loss due to the diffusion or spreading out of components within conduits in the backflushing valve. For example, the three unknown peaks around the methyl cyclohexane and the 1,1-dimethyl cyclopentane, 2,3-dimethyl pentane, 3,3-dimethyl pentane, 2,4-dimethyl pentane and 2,2-dimethyl pentane peaks are completely erased. The n-heptane, trans-1,2-dimethyl cyclopentane, cis-1,2-dimethyl cyclopentane, and trans-1,3-dimethyl cyclopentane peaks have also been substantially flattened out. It must also be noted that there is appreciably more base line drift in the output from Run 2 than from Run 1. Therefore, it is readily apparent that the elution and backflushing procedure utilizing the blending device of this invention is a substantial improvement over previous methods.

It is readily apparent that various changes, modifications, and substitutions can be incorporated in the illustrated embodiment without departing from the spirit of the invention as defined by the claims.

I claim:

1. In a chromatographic analysis process wherein sample components are eluted through a first chromatographic separation zone by a first carrier gas stream, and said first chromatographic separation zone is thereafter backflushed while components eluted therethrough are simultaneously eluted through a second chromatographic separation zone or to a detector zone by a second carrier gas stream from a junction zone between said first chromatographic separation zone and said second chromatographic separation zone or said detector zone, the improvements comprising, preventing pressure transients in the system by passing said first carrier gas stream with said eluted components through a gas blending zone located between said first chromatographic separation zone and said second chromatographic separation zone or said detector zone, the flow rate of said first carrier gas stream being increased while passing through said gas blending zone; passing said second carrier gas stream to said gas blending zone and maintaining the pressure of said second carrier gas stream constant so that as the flow of said first carrier gas ceases, the second carrier gas stream will simultaneously backflush the first chromatographic separation zone and elute said components through said second chromatographic separation zone or to said detector zone.

2. The method of claim 1 wherein the pressure of said second carrier gas stream is maintained from 1-5 percent below that of said first carrier gas stream and portions of the sample peaks are thereby transferred from said first carrier gas stream to said second carrier gas stream.

3. The method of claim 1 wherein the pressure of said second carrier gas stream is maintained from 1-5 percent higher than the pressure of said first carrier gas stream to thereby prevent said sample components from diffusing into said junction zone.

4. In a chromatographic apparatus having an upstream chromatographic column and a downstream chromatographic column or detector, improvements comprising, at least one carrier gas blending device operatively connecting a first conduit from said upstream chromatographic column and a second conduit to said downstream chromatographic column or detector comprising an outer conduit chamber operatively attached to said conduits, said outer chamber having a third conduit attached thereto, a source of constant pressure carrier gas connected to said third conduit, a first inner nozzle contained within said outer conduit chamber and communicating with said first conduit, the exhaust end of said first inner nozzle having a smaller diameter than said first conduit and said second conduit, a second inner nozzle which communicates with said third conduit and extends into said outer conduit chamber, the exhaust end of said second inner nozzle having a smaller diameter than said second and third conduits.

5. Apparatus in accordance with claim 4 wherein said second inner nozzle extends into said second conduit.

6. Apparatus in accordance with claim 5 wherein said first inner nozzle extends into said second conduit.

7. Apparatus in accordance with claim 4 wherein said first and second inner nozzles extend into said chamber parallel to the axis of said chamber in the direction of said second conduit.

References Cited

UNITED STATES PATENTS

| 2,594,476 | 4/1952 | Miller | 137—604 |
| 3,257,180 | 6/1966 | King | 48—180 |
| 3,027,241 | 3/1962 | Andreatch et al. | 23—254 |
| 2,061,032 | 11/1936 | Huff | 230—95 |

OTHER REFERENCES

"Multiple Columns in Chromatography," Control Engineering, January 1961, pp. 77–81.

Back-Flushing Pre-Column Assembly, W. & G. Pye & Co. Ltd. The Scientific Inst. Ctr., Cambridge, England. Bulletin No. 161/2m/7.62/F & J.

Gaseous Sample Dilution System for the Gas Chrom. by Saltzman et al., Analytical Chem. vol. 38(6) 1966, pp. 800–01.

JAMES J. GILL, *Primary Examiner.*

VICTOR J. TOTH, *Assistant Examiner.*